Sept. 16, 1930. H. W. BERKLER 1,775,842
DISK HARROW ASSEMBLY AND DRAFT HITCH
Filed May 27, 1929
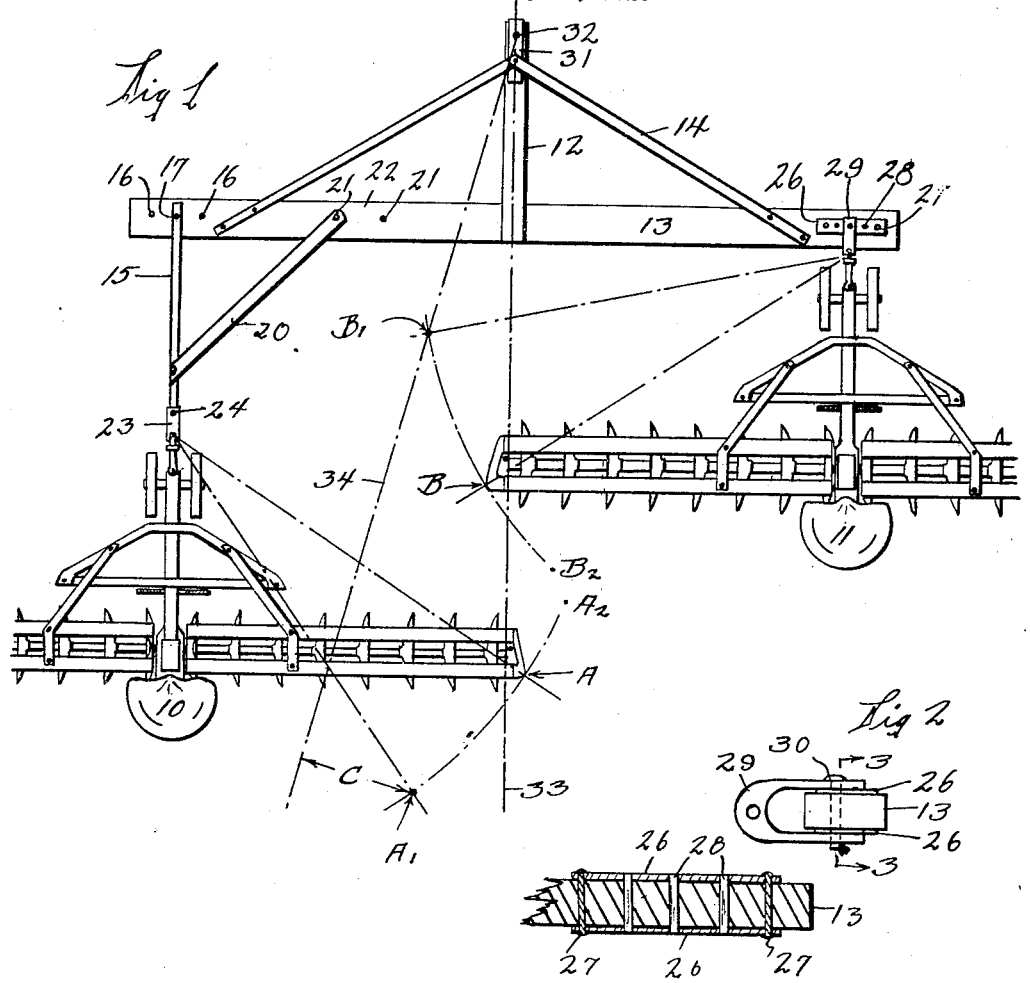
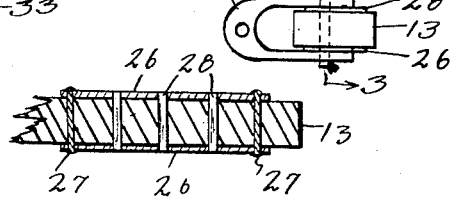
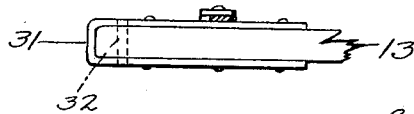
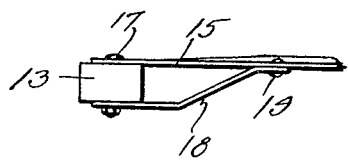
Inventor
Henry W. Berkler,
By Lynn H. Latta
Attorney Patented Sept. 16, 1930

1,775,842

UNITED STATES PATENT OFFICE

HENRY W. BERKLER, OF STORM LAKE, IOWA

DISK-HARROW ASSEMBLY AND DRAFT HITCH

Application filed May 27, 1929. Serial No. 366,293.

My invention relates to tandem disk harrow arrangements and has for its object to provide such an arrangement in which the paths of the two harrows may be made to overlap as to thoroughly fuse the paths of action of the two harrows so that no ridge of solid earth will be left between them.

Another object of my invention is to provide an arrangement adapted to accomplish this overlapping of the harrows and also to allow the harrows to swing freely on turning in either direction without interfering with each other.

A further object is to provide such an arrangement in which the paths of the harrows will always overlap, whether traveling in a straight line or turning in either direction.

A further object of my invention is to provide a simple draft hitch which is durable and strong in construction and adapted to accomplish all of the foregoing objects when arranged with a pair of harrows hitched to it.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of the draft hitch and a pair of disk harrows attached thereto, the relation of the harrows to each other during turning movement being indicated in diagram.

Fig. 2 is an elevation of one end of the draft beam with a borrow clevis attached.

Fig. 3 is a detail, sectional view taken on the line 3—3 of Fig. 2.

Fig. 4 is a detail, sectional view of the forward end of the draft tongue.

Fig. 5 is an end elevation of the draw bar and the beam and the draw bar.

I have experimented with various devices for pulling a pair of disk harrows in tandem, including a simple draft beam with both harrows hitched directly to the beam and find that with such an arrangement, the harrows cannot be brought close enough together to pulverize the entire area of ground between their opposed extremities. A ridge of solid ground will be left between their adjacent ends, which is very objectionable.

In attempting to solve the problem of thorough pulverizing, I have attempted to hitch the harrows together so that they can be drawn in overlapping arrangement. But this presents several problems. If the harrows are hitched close together with their ends overlapping, they will collide when it is attempted to turn in one direction and the turning movement will be hampered, due to the interlocking of the harrows. When the harrows interlock, they will be prevented from pulling naturally from their points of attachment and will be forced away from their natural positions perpendicular to the course of travel.

One element of my invention is embodied in the overlapping of the harrows so as to allow their paths to overlap.

Another element of my invention arising from the problem just mentioned is that of positioning one harrow a substantial distance behind the other harrow sufficient to keep the harrows always clear of each other even when making a short turn.

But a still further problem presents itself in the making of a turn in the opposite direction to that in which the harrows approach each other. When the harrows are hitched one behind the other, they will swing toward each other when the hitch is turned in one direction and will swing away from each other when the hitch is turned in the other direction. That is, their adjacent ends will swing toward and away from each other, respectively.

I have discovered that if the rear harrow is hitched to the draft beam in such a manner that its axis of swing is located at the beam, that upon turning in the direction in which the harrows swing away from each other the paths of the harrows will diverge sufficiently to leave an unpulverized section of ground lying between them.

I have discovered that this problem may be remedied by hitching the rear harrow to a rigid extension of the draft beam so that the axis upon which the rear harrow swings is located rearwardly of the draft beam a distance substantially equal to the distance between the harrows in their direction of normal straight line travel and is rigidly located at all times relative to the draft beam.

In the accompanying drawings, I have used the reference characters 10 and 11 to indicate the rear and forward harrows, respectively. The harrows are shown in unshaded lines and the hitch is shown in full shaded lines. The hitch comprises the longitudinal draft tongue 12, to the rear end of which is secured the transverse draft beam 13. Braces 14 extend from near the forward end of the tongue 12 to the beam 13 near its ends and are secured to the tongue and to the beams so as to form a rigid T-shaped structure.

The draw bar 15 may be secured to any one of three openings 16 in one end of the beam by means of a bolt 17, adapted to extend through the draw bar and through the openings. In order that the draw bar may pull from both the upper and lower sides of the beam, it is provided in the form of a fork formed by the member 18, secured at 19 to the bar 15. (See Fig. 5.) The draw bar brace 20 is secured to the draw bar as shown and is adapted to be adjustably secured to any one of the openings 21 in the beam 13 by means of a bolt 22.

The clevis 23 of the rear arrow 10 is secured to the rear end of the draw bar 15 by means of the bolt 24.

The end of the beam opposite the draw bar is provided with a pair of plates 26, which are secured by securing elements 27 to the upper and lower faces of the beam 13. Openings 28 extend through the plates 26 and the beam 13. The clevis 29 of the forward harrow 11 is adapted to be secured to the beam by extending the clevis bolt 30 through any of the several openings 28.

The forward end of the tongue 12 is provided with a yoke 31 and an opening 32 is provided through the yoke 31 in the tongue to receive the clevis bolt of the tractor draw bar or the clevis bolt of the doubletree used in hitching a team of horses to the hitch.

The object of the plates 26 and the yoke 31 is to prevent wearing of the openings through the wood of the beam 13 and tongue 12, respectively.

The normal path of straightforward movement of the harrow assembly is indicated by the broken line 33 in Fig. 1 and it will be seen that the harrows are so arranged that their paths of movement overlap.

When the draft hitch is pulled to the right in turning a corner to the right, the points A and B of the harrows will move toward the points $A^2$ and $B^2$, respectively.

The spacing of the harrows rearwardly of each other is sufficient so that on the shorter turn, which will normally be made with the harrow, the points $A^2$ and $B^2$ will never approach close enough together to cause the harrows to collide.

When the assembly is swung in the other direction to make a turn to the left the points A and B will swing toward the points $A^1$ and $B^1$, respectively, which indicate approximately the limits of movement on the shortest turn.

The line 34 indicates approximately the direction of movement relative to the position of the harrow as indicated in full lines in Fig. 1 when the assembly is being turned to the left on a short turn. It will now be seen that the distance C indicates the overlapping of the harrows during such a turn to the left. Thus it will be seen that on a turn in either direction, the paths of movement of the harrows will constantly overlap.

The L shaped construction involved in the beam 13 and the rigid draw bar 15 is necessary in order that the harrow 11 may swing to the point $B^1$ on a left band turn. It will be noted that the point $B^1$ is considerably within the embrace of the draw bar 15 and the opposite end of the beam 13.

The brace 20 is extended from the draw bar toward the center of the beam 13 so as to reduce the over all length of the beam 13 to a minimum. It will be understood that the brace 20 is permanently attached to the draw bar 15 and that when the draw bar is adjusted laterally, the brace is adjusted with it. The lateral adjustment of draw bar and clevis 29 is for the purpose of accommodating different widths of harrows.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a draft hitch for two disk harrows to be hitched in tandem, a transverse beam, a tongue rigidly secured thereto at an intermediate point, a draw bar secured to one end of the beam and extending rearwardly, a brace secured to the draw bar and to the beam, serving to position the draw bar rigidly relative to the beam, the rear end of the draw bear and the end of the beam opposite the draw bar being provided with means to form a pivotal connection with a harrow tongue, the draw bar being of such length as to position its harrow a substantial distance behind the other harrow, and the distance between the draw bar and attaching axis for the other harrow being such as to position the harrows with the paths of travel of their adjacent ends overlapping.

2. In a draft hitch for two disk harrows to be hitched in tandem, a transverse beam, a tongue rigidly secured thereto at an intermediate point, a draw bar rigidly secured to the beam at one end and extending rearwardly to form therewith a rigid, L shaped structure, the rear end of the draw bar and the end of the beam opposite the draw bar being provided with means to form a pivotal connection with a harrow tongue, the draw bar being of such length as to position its harrow a substantial distance behind the other harrow, and the distance between the draw bar and attaching axis for the other harrow being such as to position the harrows with the paths of travel of their adjacent ends overlapping.

3. A tandem disk harrow assembly comprising a tongue, a transverse beam rigidly secured thereto near the rear extremity thereof, a drawbar rigidly secured to the beam at one end and extending rearwardly to form therewith a rigid, L shaped structure, a disk harrow pivotally hitched directly to the beam at its end opposite the drawbar and a disk harrow pivotally hitched to the rear end of the drawbar spaced rearwardly a substantial distance from the other harrow and overlapping the path of travel thereof, both of said harrows being free to swing laterally about their pivotal hinge axes.

4. A tandem disk harrow assembly comprising a draft hitch including a transverse beam, a drawbar rigidly secured to the beam at one end and extending rearwardly to form therewith a rigid, L shaped structure, a disk harrow pivotally hitched directly to the beam at its end opposite the drawbar and a disk harrow pivotally hitched to the rear end of the drawbar spaced rearwardly a substantial distance from the other harrow and overlapping the path of travel thereof, both of said harrows being free to swing laterally about their pivotal hinge axes.

Signed this 10th day of May, 1929, in the county of and State of Iowa.

HENRY W. BERKLER.